(12) United States Patent
Reynolds et al.

(10) Patent No.: US 6,965,509 B2
(45) Date of Patent: Nov. 15, 2005

(54) POLY(3,4-ALKYLENEDIOXYTHIOPHENE)-BASED CAPACITORS USING IONIC LIQUIDS AS SUPPORTING ELECTROLYTES

(75) Inventors: John R. Reynolds, Gainsville, FL (US);
Kyukwan Zong, Spartanburg, SC (US);
John D. Stenger-Smith, Ridgecrest, CA (US); Nicole Anderson, Ridgecrest, CA (US); Cynthia K. Webber, Ridgecrest, CA (US); Andrew P. Chafin, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 524 days.

(21) Appl. No.: 10/307,585

(22) Filed: Dec. 2, 2002

(65) Prior Publication Data
US 2004/0106041 A1 Jun. 3, 2004

(51) Int. Cl.$^7$ ............. H01G 9/04; H01G 9/02
(52) U.S. Cl. ............. 361/528; 361/502; 361/525
(58) Field of Search ............. 361/502, 523–526; 429/212, 215, 217

(56) References Cited

U.S. PATENT DOCUMENTS

| | | | | |
|---|---|---|---|---|
| 5,812,367 A | * | 9/1998 | Kudoh et al. | 361/523 |
| 6,660,188 B1 | * | 12/2003 | Ohata et al. | 252/500 |
| 6,663,796 B1 | * | 12/2003 | Ohata et al. | 252/500 |
| 2004/0149962 A1 | * | 8/2004 | Andriessen | 252/500 |

* cited by examiner

Primary Examiner—Eric W. Thomas
(74) Attorney, Agent, or Firm—David S. Kalmbaugh

(57) ABSTRACT

A supercapacitor comprising a poly(3,4-ethylendioxythiophene) (PEDOT) and poly(3,4-propylenedioxythiophene) (PProDOT) as electrode couples for the capacitor and a pair of gel electrolyte layers disposed between the electrodes. The gel electrolytes are separated by a battery paper and are selected from a group consisting of a lithium salt and an organic electrolyte.

14 Claims, 6 Drawing Sheets

POLY (3,4-ALKYLENEDIOXYTHIOPHENE)-BASED CAPACITORS USING IONIC LIQUIDS AS SUPPORTING ELECTROLYTES

BACKGROUND OF THE INVENTION

1. Field of the Invention

The present invention relates generally to the field of electroactive polymer devices, and, in particular, to a dual conducting polymer charge storage devices/supercapacitors fabricated from poly(3,4-propylenedioxythiophene) and poly(3,4-ethylenedioxythiophene) which operate as electrode couples.

2. Description of the Prior Art

Electroactive polymer devices, in which the polymers store charge and are switched between redox states, have been the object of intense research over the past several years. As these polymers have the possibility of being switched between their neutral form, a p type doped oxidized form, and an n-type doped reduced form, a variety of electrode configurations are possible and highly desirable. This has been illustrated by the use of electroactive polymers in supercapacitors, rechargeable storage batteries, and electrochromic devices.

As a family of polymers, the poly(3,4-alkylenedioxythiophenes) (PXDOTs) have very useful redox switching properties due to their electron-rich character which yields very low switching potentials. The parent polymer of this family, poly(3,4-ethylenedioxythiophene) (PEDOT), has now been developed to the point of commercialization and is used as a stable conducting material in photographic film, tantalum capacitors, and feed through holes in printed circuit boards. In addition, poly(3)3,4-alkylenedioxythiophenes) switch rapidly and efficiently between their neutral and p-doped forms with a minimum of side reactions and long switching lifetimes. Accordingly, poly(3)3,4-alkylenedioxythiophenes) are being heavily investigated for a number of redox devices including electrochromic applications.

A key component in many electrochromic and other redox switching devices is the formulation of solvent-swollen polymer-supported electrolytes. These electrolytes generally consist of a high-boiling plasticizer, a high molecular weight polymer such as poly(methylmethacrylate) (PMMA), and a lithium salt, such as lithium bis(trifluoromethylsulfonyl) imide (Li-BTI). Although this formulation works well, the speed of electroactive switching device is often limited by the conductivity of the electrolyte formulation and the ability of the ions to move into and out of the electroactive polymer layers.

Since an increase in switching speed of these switching devices is highly desirable for many applications, new electrolyte formulations are needed. One such electrolyte formulation to be considered are the molten salts. Electrolytes using the 1-ethyl-3-methyl-1-H-imidazolium (EMI$^+$) cation have shown promise as high speed switching devices. Because of its organic nature, the fact that the 1-ethyl-3-ethyl-1-H-imidazolium (EMI$^+$) cation is less solvated than Li$^+$, and the fact that the cation exhibits a relatively large electrochemical window, makes the cation an excellent candidate for use in gel electrolytes. Furthermore, EMI-BTI is stable up to 300° C., and has an electrochemical window of 4.3 Volts, both of which are highly desirable properties in electrolytes.

It has been suggested that ion-ion interactions in electrolytes provide the following results: (1) Na$^+$ is in a highly complexing environment with AICl$_4^-$, while EMI$^+$ is not; (2) salvation for Na$^+$ is higher than EMI$^+$ (Na$^+$ even distorts the AICl$_4^-$ anion to some extent); (3) EMI$^+$ interacts only weakly with the PF$_6^-$ anion; (4) dimethylpropylimidizolium cation complexes (via H-bonding) with the Cl$^-$ anion, but not with the larger AICl$_4^-$ anion; (5) Li$^+$ has a fairly high salvation energy, even approaching that of water; and (6) oxidative intercalation of the organic cation into graphite occurs at a potential that is negative of that predicted for Li$^+$ intercalation. This latter fact might result from lower salvation energy of the organic cation and/or a more stable organic-graphite versus Li$^+$— graphite complex.

Another possible explanation is that since Li$^+$ is a small polarizing cation where as EMI$^+$ is larger and less polarizing, weaker columbic interactions in the EMI$^+$-based electrolytes are present leading to a higher mobility of EMI$^+$. It has been reported that Li$^+$ and other cations have a very strong complexing ability, as evidenced by density, molar volummes and thermal expansion coefficients data.

Not all the above are not direct measurements of salvation energy and columbic interaction differences. However, they do provide compelling evidence that the cations in room temperature liquid electrolytes are either not as solvated as alkali metal cations, or the columbic interactions in EMI$^+$-based electrolytes are weaker. Both of these theories suggest that molten salt cations would tend to have higher mobilities. Accordingly, this suggests that devices constructed using room temperature ionic liquids as the supporting electrolyte would tend to switch more rapidly than devices with lithium as the supporting electrolyte.

SUMMARY OF THE INVENTION

A charge storage device comprising a poly(3,4-ethylendioxythiophene) (PEDOT) and poly(3,4-propylenedioxythiophene) (PProDOT) as electrode couples for the charge storage device and a pair of gel electrolyte layers disposed between the electrodes. The gel electrolytes are separated by a battery paper and are selected from a group consisting of a lithium salt and an organic electrolyte. The lithium salt used in the present invention is lithium bis(trifluoromethylsulfonyl)imide (Li-BTI). The organic electrolyte used in the present invention is 1-ethyl-3-methyl-1H-imidazolium bis (trifluoromethylsulfonyl)imide (EMI-BTI). The electrolyte may also comprise an organic solvent-swollen polymer wherein the organic solvent-swollen polymer may be, for example, Polymethylmethacrylate swollen with tetraglyme.

Switching speeds and cycle lifetimes were compared using the lithium salt and the organic electrolyte as the gel electrodes. The results indicate that switching speeds, and cyclic lifetimes for the EMI-BTI organic electrolyte are superior to the LI-BTI electrolyte.

BRIEF DESCRIPTION OF THE DRAWINGS

FIGS. 5 and 6 depict a schematic diagram for a preferred embodiment of a capacitor comprising the present invention;

DETAILED DESCRIPTION OF THE PREFERRED EMBODIMENTS

Figure 1:
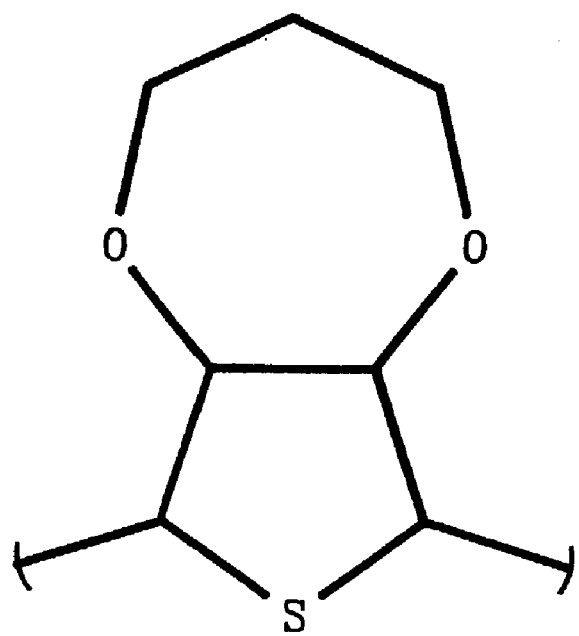
FIG. 1 depicts a chemical structure for PProDOT.
Figure 2:
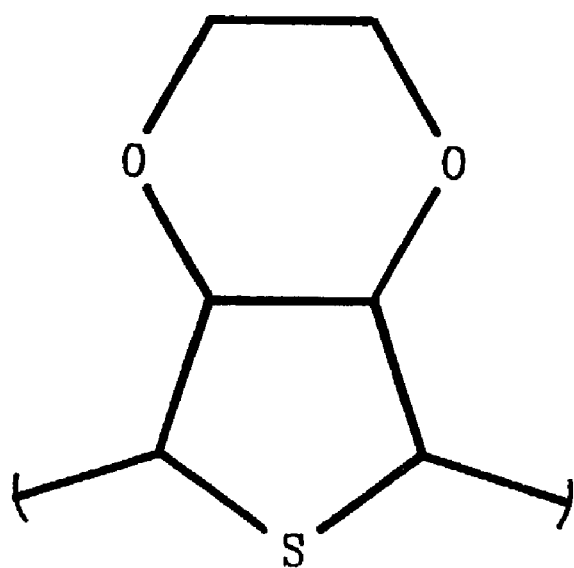
FIG. 2 depicts a chemical structure for PEDOT.

The first step in developing and fabricating a charge storage device which may be a supercapacitor or a battery in accordance with a preferred embodiment of the present invention was to synthesize EMI-BTI which has the chemical formula 1-ethyl-3-methyl-1H-imidazolium bis(trifluoromethylsulfonyl)imide. Lithium bis(trifluoromethylsulfonyl)imide (LI-BTI) is commercially available from 3M Company of St. Paul, Minn.

A solution of silver bis(trifluoromethylsulfonyl)imide (0.202 moles) in 300 mL of ethanol was made by the addition of 23.50 silver (I) oxide (0.101 moles) to a solution of 56.890 bis(trifluoromethylsulfonyl)imide (0.202 moles). After dissolution was complete, a solution of 29.78 N-ethyl-N'-methylimidazolium chloride (0.202 moles) in 50 mL of ethanol was added. The silver chloride was filtered off and the filtrate was concentrated under a vacuum to give 78.13 grams of a straw colored liquid (99%). The straw colored liquid was purified by column chromatography on a silica gel eluting with 20% acetonitrile/chloroform ($R_f$= 0.62) to give 73.19 grams of a light colored oil (93%).

The material was characterized using H, C and F nuclear magnetic resonance (NMR) spectroscopy as well as infrared spectroscopy. The results for H NMR spectroscopy were as follows: $^1$H (CD$_3$CN): 8.40, s, H; 7.37, t, 1H; 7.32, t, 1H; 4.16, q, 2H; 3.81, s, 3H; 1.45, t, 3H. The results for C NMR spectroscopy were as follows: C (CD$_3$CN) : 136.7, 124.7, 123.1, 121.1 (q, J= 321 Hz)-7 45.9, 36.9, 15.5. The results for F NMR spectroscopy were as follows: F (CD$_3$CN); –77.9, s. The results of infrared spectroscopy were as follows: 3160, 3123, 1574, 1471, 1352, 1333, 1227, 1195, 1057, 790, 762, 740, 650, 617, 602, 571, 514.

Elemental analysis was also performed to determine residual silver content. All samples were found to have silver content below the detection limit (0.01% by weight).

The next step in fabricating the charge storage device/supercapacitor was to conduct electrochemical studies as a screening method for the use of LI-BTI and EMI-BTI as supporting electrodes for the charge storage device/supercapacitor. The polymer [poly(propylene dioxythiophene) (PProDOT)] was deposited using cyclic voltammetry from –0.7 to 1.5 V at 100 mV/s from a 0.02 M solution of propylene dioxythiophene (PProDOT) in 1.5 M Li-BTI in propylene carbonate (PC). Unless otherwise noted, all electrochemistry described is reported vs Ag wire.

After deposition, the working electrodes were removed and rinsed with a fresh monomer-free solution of 1.5 M of Li-BTI in , and then the polymer was cycled using monomer-free 1.5 M Li-BTI in propylene carbonate. The films were cycled from –0.5 to +1.0 V at 50, 100, 200, 400, 600, 800, and 1000 mV/s in order to get a baseline response of their electrochemical properties. Films were then cycled at 100 mV/s for a total of 500 and 5000 cycles, and their CV response analyzed after the respective number of cycles was reached. The total amount of charge (cathodic or anodic) was obtained from a current versus time trace for each sweep speed. Results for both electrolyte systems were normalized versus the total charge obtained for the respective fresh film (0 cycles) at 50 mV/s. Polymer films were then deposited and analyzed with the same procedures and conditions using EMI-BTI as the electrolyte.

Referring to FIGS. 1, 2, 6 and 7, a thin film 20 of PEDOT (FIG. 2) was electrochemically deposited as a 0.15 micrometer thick film on a 92 mm$^2$ gold electrode 24. In a like manner, a thin film 26 of PProDOT (FIG. 1) was electrochemically deposited on a 0.15 micrometer thick film on a 92 mm$^2$ gold electrode 28.

For the PProDOT electrode 26 which is the anode of the supercapacitor 30, the PProDOT polymer was fully oxidized at +0.5 V, rinsed with a monomer free propylene carbonate (PC)-based electrolyte solution and carefully blotted dry with lint-free paper. The PProDOT polymer was next coated with a gel electrolyte layer 32 which comprised 70% tetraethylene glycol dimethyl ether, 20% ultra high molecular weight PMMA and 10% EMI-BTI. A sheet of 20 $\mu$m thick battery separator paper 34 was placed on the electrolyte layer, and an additional electrolyte was added to sufficiently wet the battery separator paper 34.

Battery paper 34 separates the conductive polymer layers 20 and 26 of the capacitor 30 (cathode and anode) which keeps the conductive polymer layers from being in electrical conduct with one another and shorting out.

For the PEDOT electrode 20 which is the cathode of the supercapacitor 30, the polymer was fully neutralized at –0.5 V, rinsed with the monomer-free electrolyte solution, carefully blotted dry and coated with the gel electrolyte (which the gel electrolyte layer 38 in FIG. 6) in the same manner as the PProDOT electrode 26. The two electrodes were then pressed together and held in place with a 100-gram weight. Excess electrolyte was removed by blotting with lint-free tissue paper.

Testing of the charge storage device/supercapacitor was performed in a laboratory atmosphere using a 2-electrode cyclic voltammetry 36 having the reference and working electrode shorted together. Supercapacitors were equilibrated for 10 seconds at 0 Volts, then ramped to 0.5 Volts at 100 and 1000 mV/sec.

Figure 6:
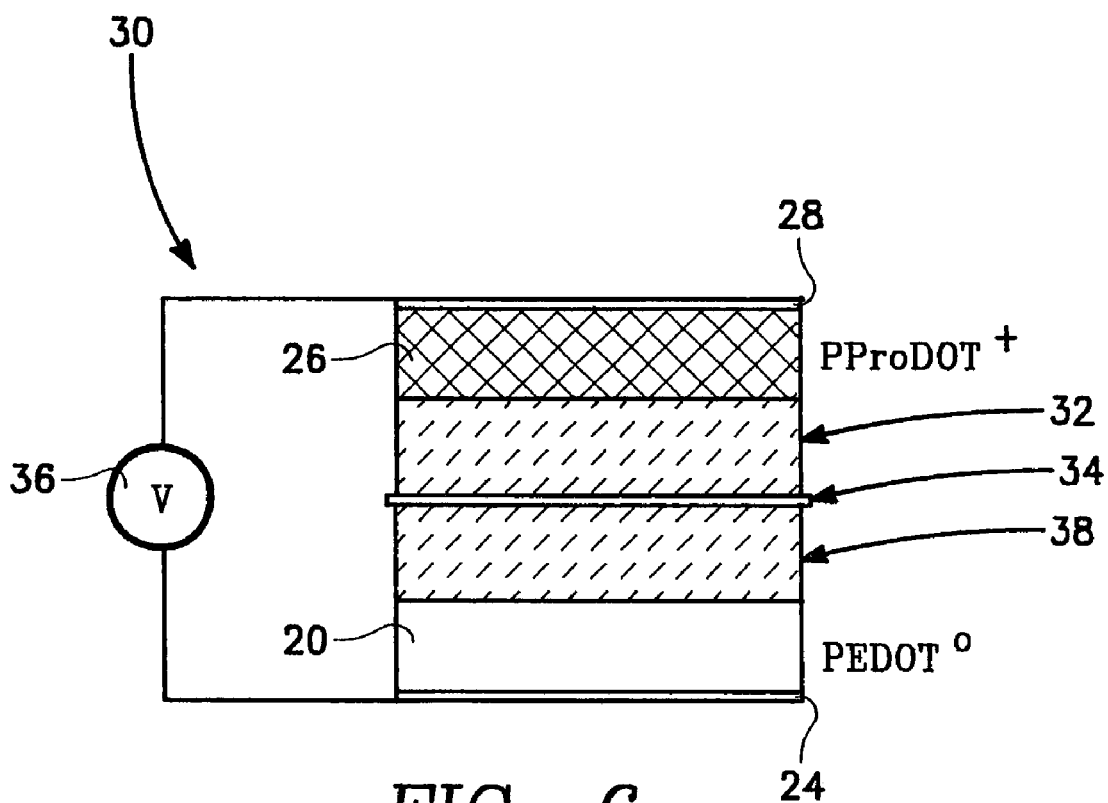
Figure 7:
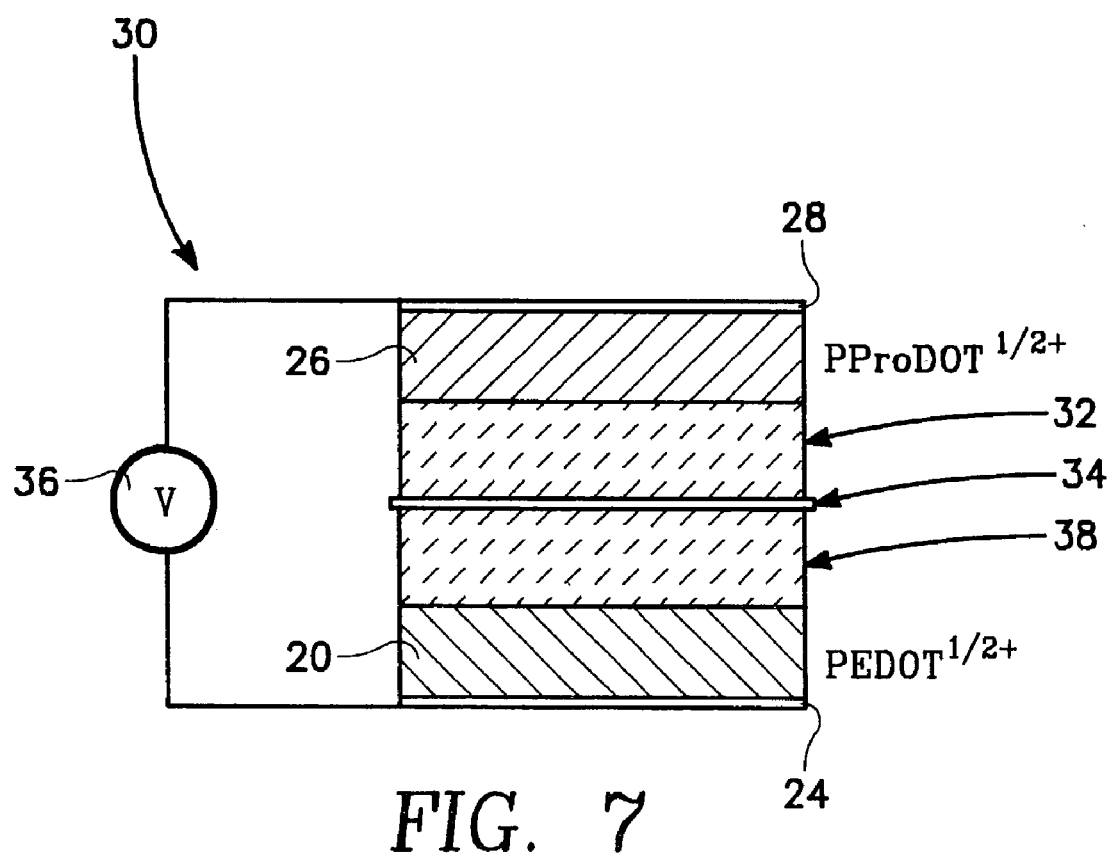
FIG. 7 depicts a current versus voltage plot for EMI-BTI based capacitor cycled at 500 mV/s.

Schematics for the PEDOT/PProDOT supercapacitors studied are given in FIGS. 6 and 7. As fabricated, the PProDOT electrode 26 is initially set in a p-doped (fully oxidized) form and laminated with a neutral PEDOT film to set the initial charged state of the supercapacitor 30. Charge neutralization of the p-doped PProDOT electrode 26 proceeds with concurrent oxidation of the PEDOT electrode 20 in the supercapacitor 30. As equivalent amounts of polymer were deposited on each electrode 20 and 26, the supercapacitor discharges to a partially-oxidized PProDOT$^{1/2+}$ and a partially oxidized PEDOT$^{1/2+}$ as depicted in FIG. 7. Cycling the potential of voltammetry 36 leads to switching of the supercapacitor 30 between the charged and discharged states.

Figure 3:
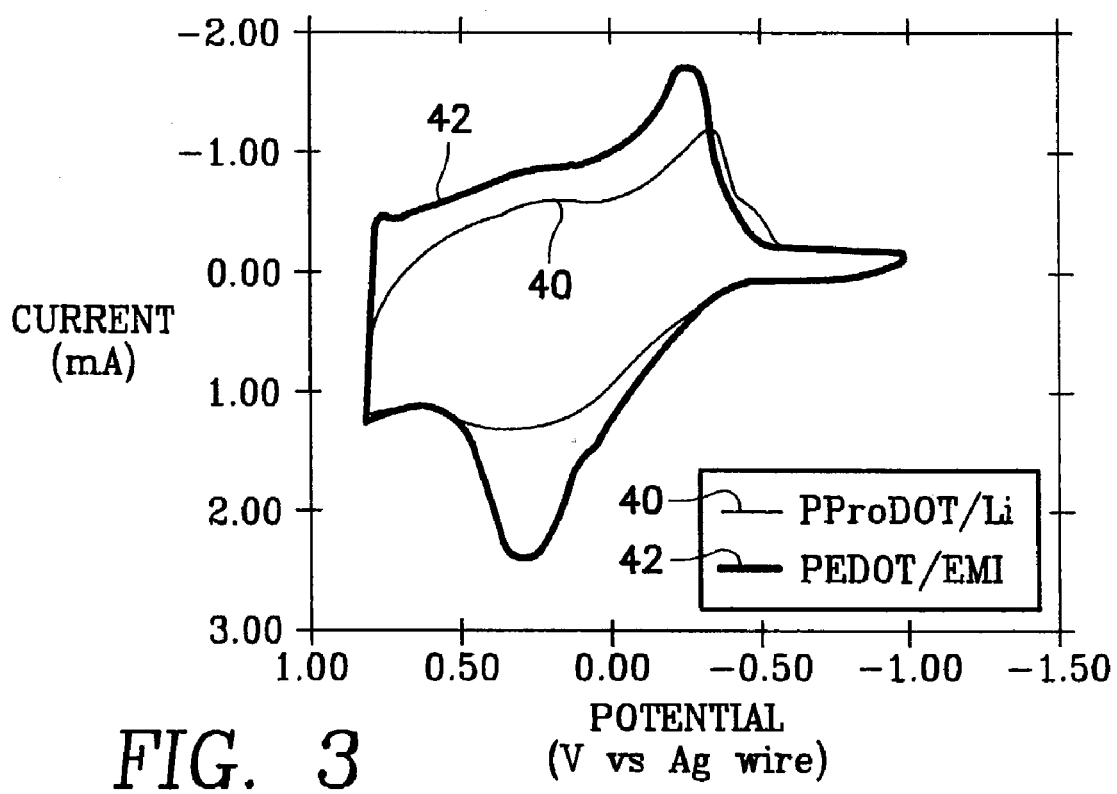
FIG. 3 illustrates a plot for the cyclic voltammetry responses of PEDOT/Li-BTI and PEDOT/EMI-BTI.
Figure 4:
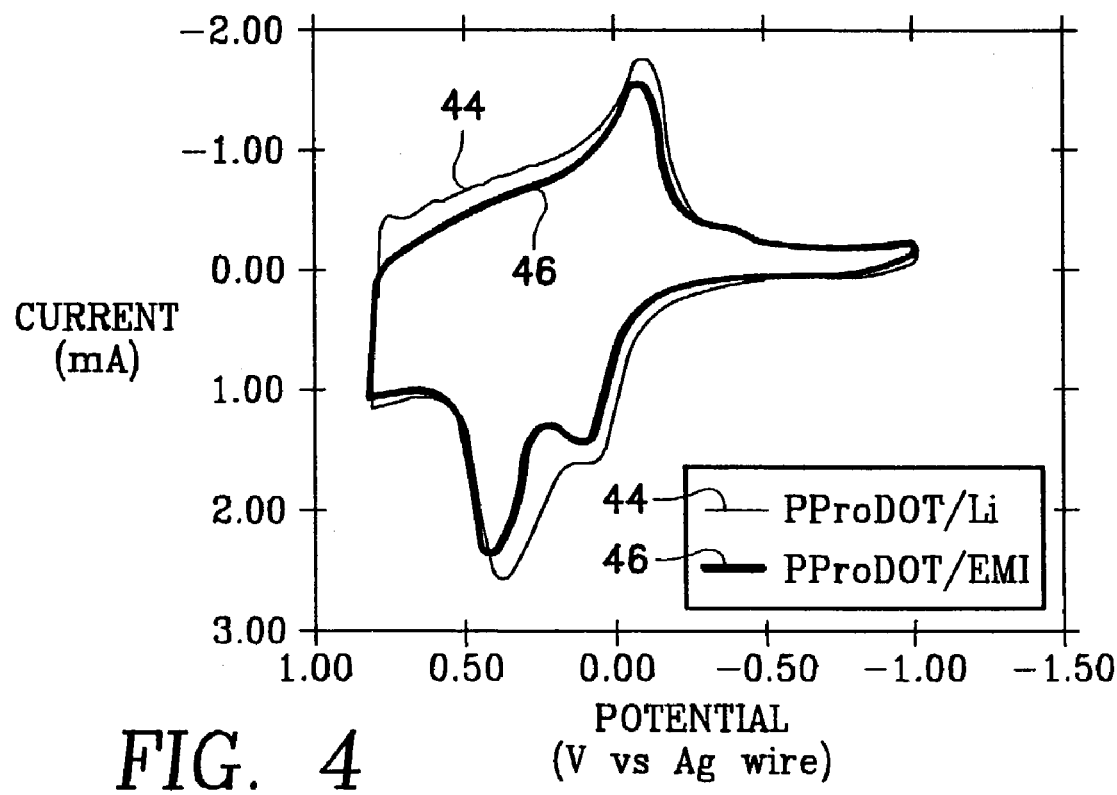
FIG. 4 illustrates a plot for the cyclic voltammetry responses of PProDOT/Li-BTI and PProDOT/EMI-BTI.

Referring to FIGS. 3, 4 and 6, the cyclic voltammetry responses of PEDOT/Li-BTI, PEDOT/EMI-BTI, PProDOT/Li-BTI and PProDOT/EMI-BTI, performed at 100 mV/s, are shown in FIGS. 3 and 4, respectively. As shown in FIG. 3, PEDOT/Li-BTI which is plot 40 and PEDOT/EMI-BTI which is plot 42 have similar $E_{1/2}$ potentials versus Ag (silver) wire. As shown in FIG. 4, PProDOT/Li-BTI which is plot 44 and PProDOT/EMI-BTI which is plot 46 also have similar $E_{1/2}$ potentials versus silver wire. As shown in FIG. 4, the peaks in the cyclic voltammetry response of PProDOT/Li-BTI (plot 44) and PProDOT/EMI-BTI (plot 46) are similar in shape, with the peaks in the oxidative wave of PProDOT/EMI-BTI being slightly better defined. As shown in FIG. 3, the peaks in the response of PEDOT/EMI-BTI (plot 42) are more well-defined than those in the cyclic voltammetry response of PEDOT/Li-BTI (plot 40). The results illustrated in FIGS. 3 and 4 suggest faster and cleaner transport processes with the EMI cation.

Figure 5:
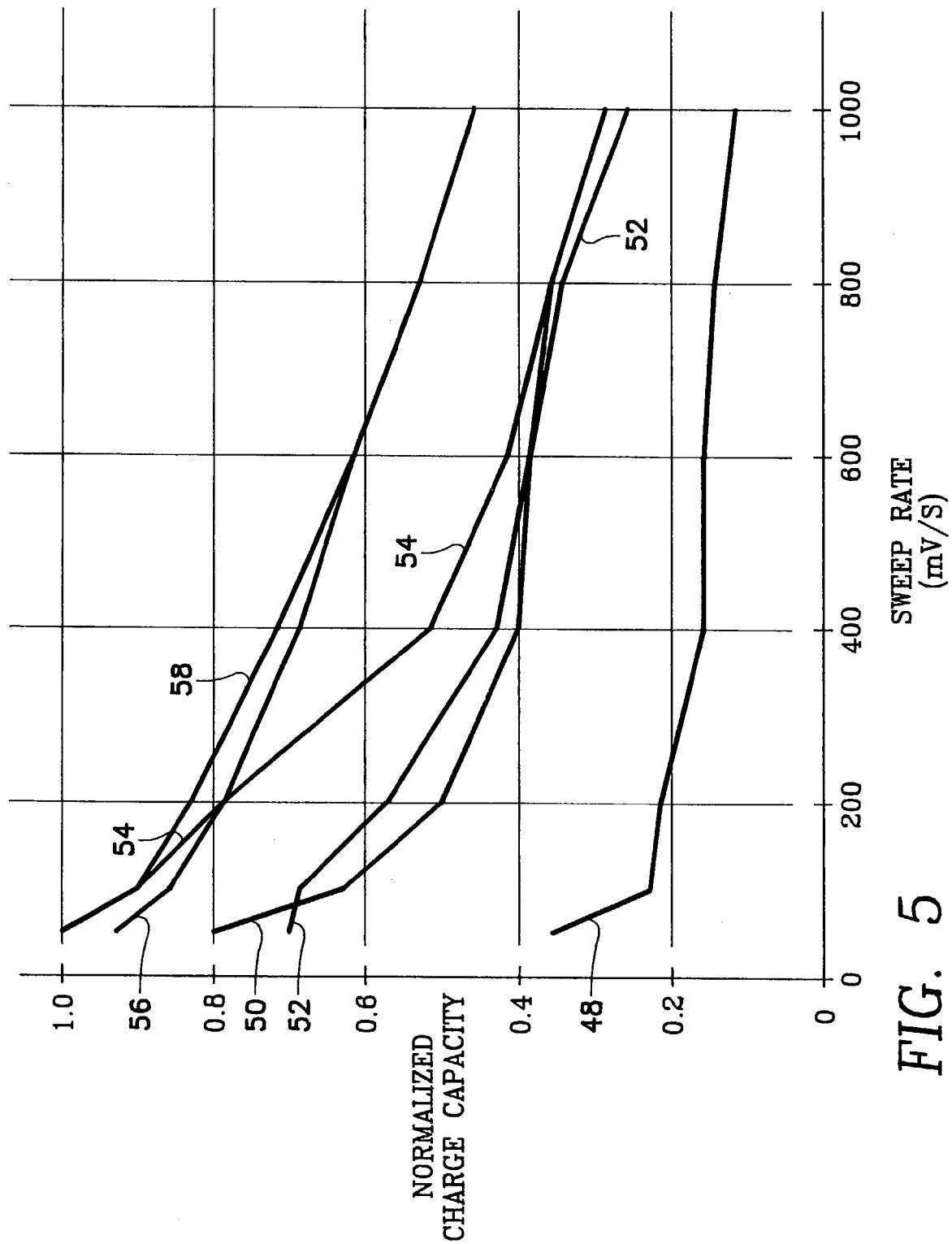
FIG. 5 depicts the charge capacity versus sweep rate of PProDOT/Li-BTI and PProDOT/EMI-BTI for 0.500 cycles and 5000 cycles.

Referring to FIG. 5, the cation dependence of the redox switching lifetime and rates were measured with the measurements being illustrated in FIG. 5. PProDOT films which were 100 nm thick with a capacity of approximately 1.5 mC were measured by cyclic voltammetry as a function of scan rate. Cycling from −0.5 V to +1.0 V at sweep rates ranging from 50 mV/s to 1000 mV/s was carried out and the charge required for switching was measured. FIG. 5 shows the normalized charge capacity of the PProDOT film as a function of sweep rate in the two electrolytes Li-BTI and EMI-BTI.

Specifically, plot 48 depicts charge capacity versus sweep rate for Li-BTI at 0 cycles; plot 50 depicts charge capacity versus sweep rate for EMI-BTI at 0 cycles; plot 52 depicts charge capacity versus sweep rate for Li-BTI at 500 cycles; plot 54 depicts charge capacity versus sweep rate for Li-BTI at 5000 cycles; plot 56 depicts charge capacity versus sweep rate for EMI-BTI at 500 cycles; and plot 58 depicts charge capacity versus sweep rate for EMI-BTI at 5000 cycles.

As shown in FIG. 5, the charge capacities are essentially identical at low switching speeds of up to about 150 mV/s. At higher switching speeds, it is evident that the EMI-based electrolyte allows more rapid switching and, thus, can retain a higher level of charge at any specific switching rate. While the overall charge density that can be attained decreases as a function of scan rate, PProDOT/EMI-BTI passes about 80% more charge than Li-BTI at the highest sweep rate.

A determination was also made as to which ion is most dominant in transport during redox switching. In most instances, using relatively small, non-nucleophilic anions, the PXDOT family shows anion dominant transport. In this instance, though, the relatively large organic BTI anion has the possibility of being entrapped and retained in the conducting polymer membrane, thus forcing at a least a portion of the transport to be due to the cation. External and internal transport numbers which are calculated indicate that organic cations may function as charge carriers. The actual transport mechanism in these systems is likely complex and best described as mixed transport from both ions. This is confirmed by the large difference in the electrochemical response time for these two different cations.

This ion transport effect holds as a function of switching lifetimes as evidenced by the charge capacity results shown for PProDOT in FIG. 5 after 500 and 5000 cycles, respectively. In both instances as shown by plot 56 at 500 cycles and plot 58 at 5000 cycles, PProDOT/EMI-BTI is shown to pass significantly more charge, that is have a substantially higher charge capacity. As the films have now had their electrochemistry "broken in", it can be seen by plot 50 that the charge capacity is also higher using EMI-BTI at the lower sweep rate of 0 cycles. This suggests that, after conditioning of the film, the cation transport becomes even more important to the mechanism of redox switching.

The results shown in FIG. 5 demonstrate that the EMI$^+$ ion is transported faster than the Li$^+$ ion and significantly more charge capacity is maintained as a function of the number of cycles. This suggests that the EMI-BTI electrolytes may prove more suitable in gel electrolytes for electroactive polymer charge storage devices/supercapacitors.

While the cyclic voltammetric results depicted in FIG. 5 prove useful as a valuable screening tool, it is understood that the counter half-cell reactions are, at best, not well-defined. In order to make a more rigorous comparison, two-electrode supercapacitors were fabricated in accordance with the present invention and their performance measured as a function of electrolyte.

Figure 8:
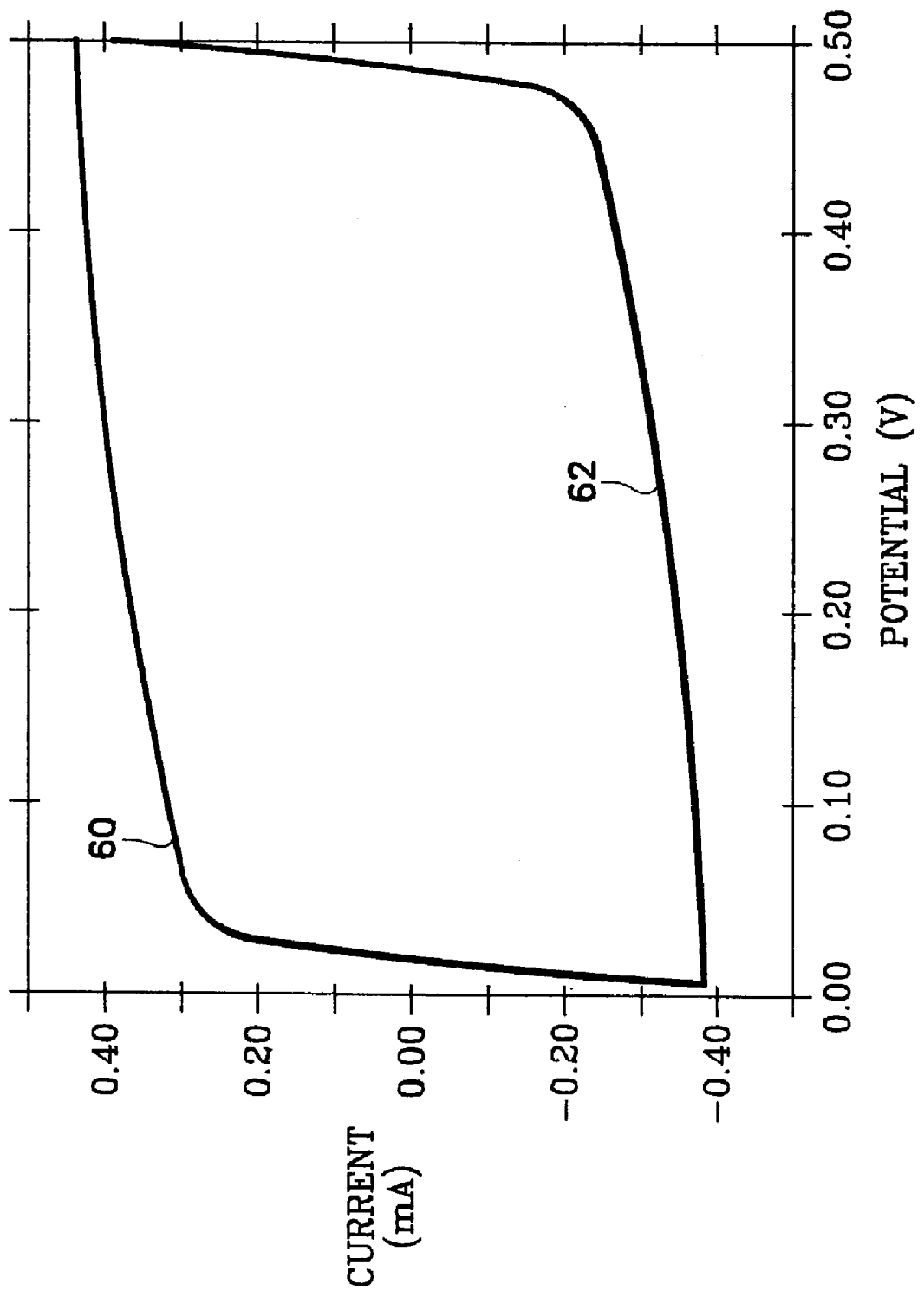
FIG. 8 depicts a cell lifetime comparison of Li-BTI based capacitor and EMI-BTI capacitor.

Referring to FIGS. 6 and 8, the columbic efficiency of the supercapacitor 30 versus overall cell voltage was analyzed. Beyond an overall cell voltage of 0.5 Volts, the storage capacity of supercapacitor 30 only increased slightly, i.e. a 3% increase at 1.0 V. The columbic efficiency of supercapacitor 30 decreased dramatically beyond 0.6 Volts and showed a nearly linear drop from 95% efficiency at 0.5 Volts to 75% efficiency at 1.0 Volts. Therefore it was decided that 0.5 Volts was the best trade-off between columbic efficiency and overall cell voltage. After first equilibrating the supercapacitor for 10 seconds at 0.0 V applied, the supercapacitor was cycled up to an applied voltage of 0.5 V and back at various cycling rates. FIG. 5 shows the current versus voltage characteristic of an ionic liquid-based EMI-BTI based supercapacitor cycled at 500 mV/s.

The distinct capacitive nature of the charge storage for supercapacitor 30 is evident from the plot 60 of FIG. 8 as there is a rapid increase in current upon application of a voltage potential followed by a long plateau in the plot 60. Reversal of the applied voltage/reverse scanning represented by the plot's return path (designated generally by the reference numeral 62) then shows discharge of the stored charge as the supercapacitor returns to its original state. At relatively slow scan rates (100–500 mV/s) the capacity measured was nearly scan rate independent at around 1.25 mC (a charge density of 1.35 mC/cm$^2$). Even cycling at rates of up 5000 mV/s gave only an approximate 20% decrease in the total charge capacity. These results indicate that the supercapacitor switched rapidly.

Estimating the mass of the polymer films on the electrodes 20 and 26 to be 2×10$^{-5}$ g, the capacity of supercapacitor 30 was found to be approximately 65 C/g. The capacity of PProDOT electrode 26 is calculated to be about 150 C/g (4 repeat units/electron) and 200 C/g (3 repeat units/electron). The capacity of PEDOT electrode 20 is calculated to be about 165 C/g (4 repeat units/electron) and 220 C/g (3 repeat units/electron).

A Type I supercapacitor uses 50% of the polymer capacity. Therefore, 65 C/g is comparable to what is expected for a PEDOT/PProDOT-based Type I supercapacitor. Polyaniline has a calculated capacity of 500 C/g (250 C/g in a Type I supercapacitor).

The charge capacity for a lithium-based supercapacitor was found to be around 1.75 mC (charge density of 1.90 mC/cm$^2$). Although quantitative comparisons are difficult (the higher capacity of these devices suggests a thicker polymer film), the capacity of the lithium based supercapacitor was found to depend upon the scan rate. The capacity decreased by almost 30% when going from 100 to 500 mV/s. These results are consistent with cyclic voltammetry studies.

Figure 9:
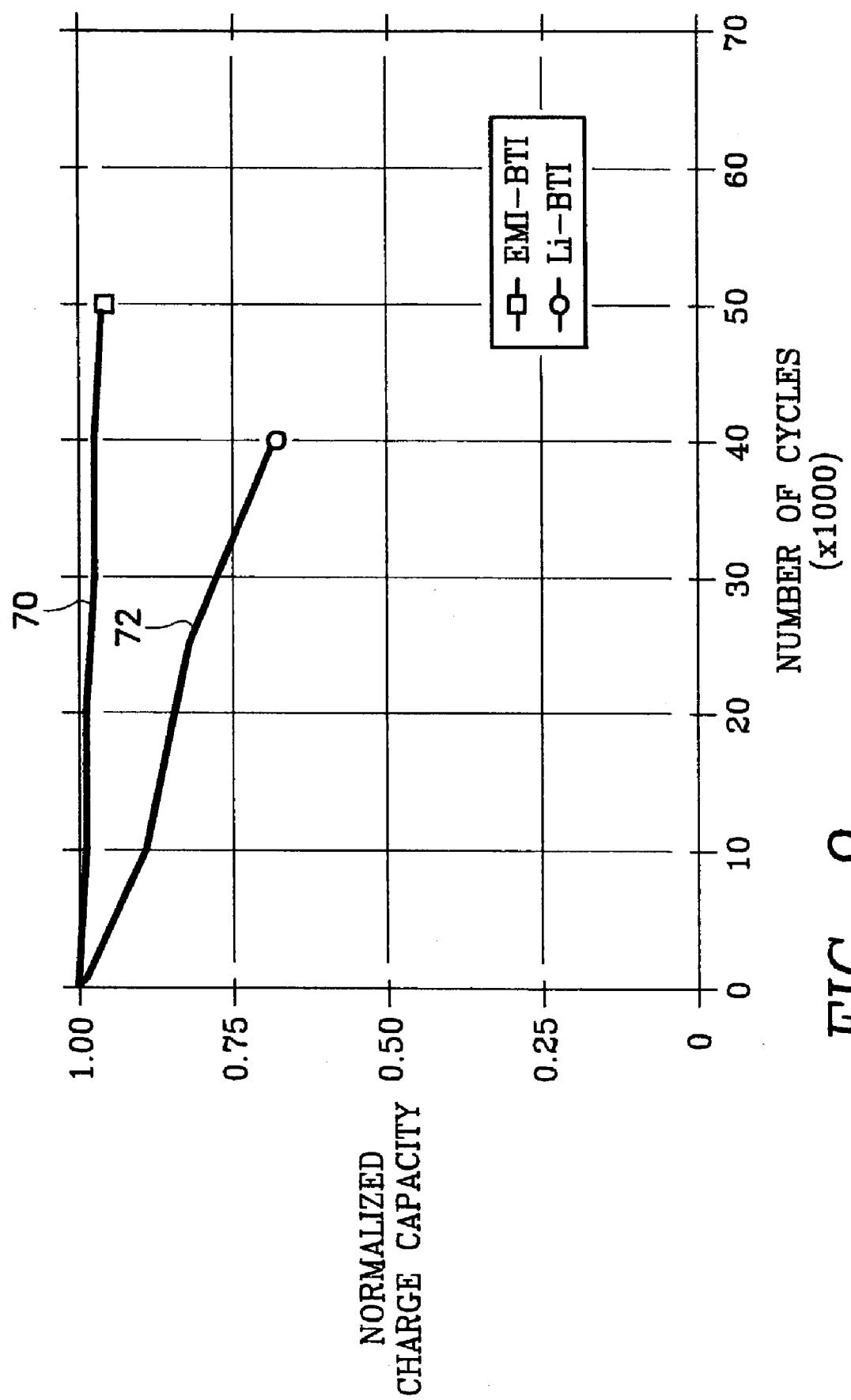

Referring to FIGS. 6 and 9, to determine cell lifetimes for Li-BTI based supercapacitors and EMI-BTI based supercapacitors, the charge capacities were measured as a function of a number of cycles up to 50,000 full cycles where a cycle is defined as scanning from 0.0 to 0.5 V and back to 0.0 V. As shown in FIG. 9, the EMI$^+$-based electrolyte as represented by plot 70 shows significant enhancement in cell lifetimes when compared to the Li$^+$ electrolyte as represented by reference numeral 72.

After 50,000 cycles, the PEDOT/PProDOT supercapacitor retained up to 98% of its initial charge capacity using the EMI$^+$ electrolytes, while there was a decrease in charge capacity of about 30% using a lithium salt, i.e. Li-BTI based capacitor. These results may prove especially important in the use of organic electrolytes in gel systems for PXDOT supercapacitors. It is possible that hundreds of thousands of cycles are now obtainable using gel systems for PXDOT supercapacitors. Given the fact that the neutral form of PEDOT is known to be air-sensitive due to its low oxidation potential, it is evident that this is not limiting cell life.

At this time it should be noted that the electrolyte may also comprise an organic solvent-swollen polymer wherein the organic solvent-swollen polymer may be, for example, Polymethylmethacrylate swollen with tetraglyme.

At this time, it should also be noted that the PProDOT/PEDOT technology used in making the present invention can also be used in fabricating batteries or any other charge storage device.

From the above, it is evident that PProDOT/PEDOT charge storage device/supercapacitors have been constructed using gel electrolytes composed of lithium and an organic (EMI$^+$) electrolyte switch quite rapidly and store similar amounts of charge. The EMI$^+$ based supercapacitor, however, is significantly superior in cycle lifetime. These results have implications that go well beyond the specific polymers and devices described and tested herein. Numerous conducting polymers can be envisioned in electroactive devices and the use of these electrochemically stable organic cations may greatly enhance their switching lifetimes. In addition to battery and supercapacitor charge storage systems, these electrolytes may find useful in electrochromic displays which long lifetimes are desired.

What is claimed is:

1. A polymer based charge storage device comprising:
   (a) a pair of spaced apart electrodes, a first electrode of said pair of electrodes consisting of a poly (3,4 propylenedioxythiophene) (PProDot) and a second electrode of said pair of electrodes consisting of a poly (3,4 ethylendioxythiophene) (PEDOT), said first electrode being an anode for said polymer based charge storage device and said second electrode being a cathode for said polymer based charge storage device;
   (b) a first electrolyte gel and a second electrolyte gel disposed between said pair of spaced apart electrodes; and
   (c) a battery paper positioned between said first electrolyte gel and said second electrolyte gel to separate said cathode for said polymer based charge storage device from said anode for said polymer based charge storage device.

2. The polymer based charge storage device of claim 1 wherein said first and second electrolyte gels comprise organic solvent-swollen polymers.

3. The polymer based charge storage device of claim 2 wherein said organic solvent-swollen polymer comprises Polymethylmethacrylate swollen with tetraglyme.

4. The polymer based charge storage device of claim 1 wherein said first and second electrolyte gels comprise lithium bis (trifluoromethylsulfonyl)imide (Li-BTI).

5. The polymer based charge storage device of claim 1 wherein said first and second electrolyte gels comprises 1-ethyl-3-methyl-1 H-imidazolium bis (trifluoromethylsulfonyl)imide (EMI-BTI).

6. The polymer based charge storage device of claim 1 wherein a first capacitor having said first and second electrolytes comprising EMI-BTI has a substantially longer cell lifetime when compared to a second capacitor having said first and second electrolytes comprising said Li-BTI.

7. The polymer based charge storage device of claim 6 wherein said first capacitor having said first and second electrolytes comprising said EMI-BTI has a switching speed which is substantially equal to a switching speed of said second capacitor having said first and second electrolytes comprising said Li-BTI.

8. The polymer based charge storage device of claim 1 wherein said polymer based charge storage device comprises a supercapacitor.

9. The polymer based charge storage device of claim 1 wherein said polymer based charge storage device comprises a battery.

10. A polymer based capacitor comprising:
    (a) a pair of spaced apart electrodes, a first electrode of said pair of electrodes comprising poly(3,4-propylenedioxythiophene) and a second electrode of said pair of electrodes comprising poly(3,4-ethylendioxychiophene), said first electrode being an anode for said capacitor and said second electrode being a cathode for said capacitor;
    (b) a first electrolyte gel and a second electrolyte gel disposed between said pair of spaced apart electrodes;
    (c) a battery paper positioned between said first electrolyte gel and said second electrolyte gel to separate said cathode for said capacitor from said anode for said capacitor; and
    (d) said first electrolyte gel and said second electrolyte gel comprising 1-ethyl-3-methyl-1 H-imidazolium bis(trifluoromethylsulfonyl)imide (EMI-BTI).

11. The polymer based capacitor of claim 10 wherein said capacitor retains approximately 98% of charge capacity for said capacitor as a function of 50,000 cycles where a cycles is a scanning of 0.0 volts to 0.5 volts and a return to 0.0 volts.

12. A polymer based capacitor comprising:
    (a) a pair of spaced apart electrodes, a first electrode of said pair of electrodes comprising poly(3,4-propylenedioxythiophene) and a second electrode of said pair of electrodes comprising poly(3,4-ethylendioxythiophene), said first electrode being an anode for said capacitor and said second electrode being a cathode for said capacitor;
    (b) a first electrolyte gel and a second electrolyte gel disposed between said pair of spaced apart electrodes;
    (c) a battery paper positioned between said first electrolyte gel and said second electrolyte gel to separate said cathode for said capacitor from said anode for said capacitor; and
    (d) said first electrolyte gel and said second electrolyte gel comprising a lithium salt.

13. The polymer based capacitor of claim 12 wherein said lithium salt comprises lithium bis (trifluoromethylsulfonyl)imide (Li-BTI).

14. The polymer based capacitor of claim 12 wherein said capacitor retains approximately 70% of charge capacity for said capacitor as a function of 50,000 cycles where a cycles is a scanning of 0.0 volts to 0.5 volts and a return to 0.0 volts.

* * * * *